United States Patent [19]

Ramp et al.

[11] Patent Number: 4,558,086
[45] Date of Patent: Dec. 10, 1985

[54] METHOD FOR SUPPRESSING ZINC STEARATE AGING BLOOM

[75] Inventors: Floyd L. Ramp, Richfield; Lothar F. Stiberth, Copley, both of Ohio

[73] Assignee: The B. F. Goodrich Company, New York, N.Y.

[21] Appl. No.: 657,447

[22] Filed: Oct. 4, 1984

[51] Int. Cl.$^4$ ............................................. C08K 5/09
[52] U.S. Cl. .................... 524/399; 528/485; 528/486
[58] Field of Search ................. 524/399; 528/486, 485

[56] References Cited

U.S. PATENT DOCUMENTS 3,479,309  11/1969  Hecker et al. ................. 524/399
3,644,248  2/1972   Luijk et al. .................... 524/399
4,383,108  5/1983   Jorgensen, Jr. ............... 528/485

Primary Examiner—Paul R. Michl
Assistant Examiner—Alex H. Walker
Attorney, Agent, or Firm—Woodrow W. Ban

[57] ABSTRACT

A method for suppressing the occurrence of aging bloom upon green or uncured rubber objects during the manufacture of rubber structures wherein the green rubber object is either purgued of proton donating substances capable of enhancing the aging bloom properties of the green rubber object or the green rubber object is maintained at a temperature below which any proton donating substances contained within the green rubber object are capable of enhancing the process of aging bloom upon the green rubber object.

8 Claims, No Drawings

METHOD FOR SUPPRESSING ZINC STEARATE AGING BLOOM

FIELD OF THE INVENTION

This invention relates to the making of shaped "green" articles suitable for being curingly molded into elastomeric objects. More particularly, this invention relates to methods for suppressing the bloom of additives incorporated into green rubber compounds employed in the making of such green articles. Specifically, this invention relates to methods for suppressing the bloom of zinc containing compounds upon aging of green or unvulcanized rubber objects into which the zinc containing compounds have been incorporated.

BACKGROUND OF THE INVENTION

Elastomeric objects are formed by shaping a precurser substance or compound capable of being cured into an elastomeric compound into a desired shaped greenware or green structure and then applying heat and optionally pressure to cure the green structure into an elastomeric object. Most frequently, the elastomeric object being formed is a rubber object and the treatment under heat and optionally pressure to form the rubber object from a formed or "laid up" green structure is frequently referred to as vulcanization. During vulcanization, molecules of the elastomeric substance become cross-linked creating a thermoset elastomer which, where the elastomer is a rubber, is typically possessed of a resilient or rubbery construction. A large number of elastomeric substances are known to be vulcanizable into an elastomeric thermoset material. Such vulcanizable elastomers generally can be classified either: as thermosetting resins, typically plastics; and rubbers, both natural and synthetic.

In the vulcanization of rubbers, typically a vulcanizing compound is employed together with the rubber to assist in cross linking molecules of the rubber. Most often this vulcanizing compound is sulfur, but a variety of other vulcnizing agents are well known. A blend of unvulcanized rubber and these vulcanizing agents may also include accelerators for vulcanization and activators for vulcanization. Suitable vulcanizing accelerators and vulcanizing activators are set forth in the *Vanderbilt Rubber Handbook*, Babbit, ed. R. T. Vanderbilt Company, Inc., Norwalk, Conn., pp 463–543.

Among activators frequently employed are reaction products of fatty acids and metallic oxides, typically zinc oxide ($ZnO_2$). The fatty acid employed typically is stearic acid, an acid readily available because of its bountiful occurrence in nature. The use of other fatty acids is known however. It is believed that zinc oxide and fatty acid contained within the green rubber compound react to form a salt of the fatty acid and the zinc. Since the fatty acid contained in green rubber is typically stearic acid, this salt is conveniently termed zinc stearate. Since natural green rubber contains fatty acid and since synthetic green rubber typically contains fatty acid residuals relating to the function of the green synthetic rubber, whether or not fatty acid must be added to green rubber in forming a green rubber structure often is solely a function of the quantity of fatty acid already present in the green rubber.

A number of compounds, when incorporated into a green rubber object, under certain conditions, may produce a bloom on the surface of an object formed from the green rubber compound. Bloom on green rubber is an elevated concentration of a particular additive material on the surface of a green rubber structure in relation to the average concentration of that particular additive material in the rubber matrix of the green structure. Where bloom occurs on green or uncured rubber stocks, the main difficulty that results is a loss of tack. Where coadherence between layers of green rubber laid up in building a green rubber object or structure is important to the integrity of a final vulcanized rubber structure, the loss of tack in building such green objects can result in deformities and uneven vulcanization. The problem of loss of tack associated with additive bloom is particularly critical in the manufacture of tires, where any resulting tire deformities can provoke an unsafe driving condition.

Particularly, where zinc and fatty acid compounds are being employed as activators for vulcanization, the appearance of a zinc-fatty acid reaction compound bloom can result in the manufacture of a rubber article wherein co-adherence of portions of the rubber article separately laid up during preparation of the precurser green object are not properly co-adhered. Where bloom developes in a green rubber compound that includes a zinc-fatty acid reaction product, two separate phenomenon have been frequently observed.

In one phenomenon, the zinc appears to bloom as a salt of the fatty acid and the bloom appears within a matter of seconds or minutes following formation of the green rubber into a shaped object. For purposes of this specification designated as thermal bloom, this relatively rapid blooming of the salt of the zinc and fatty acid, herein termed zinc stearate for convenience, appears to be linked to situations wherein the last mastication of the green rubber including the zinc and any fatty acid additives occurred above the melting point of the reaction product salt of the zinc and the fatty acid. Careful control of the temperature of the last mastication of the green rubber before forming into a green rubber object can prevent or suppress zinc stearate thermobloom with reliable predictability.

A second form of zinc stearate bloom occurs after a green rubber object has aged for a period of time. Aging bloom typically developes over a more extended time period and the development of aging bloom often appears to be enhanced by exposure of the green rubber to conditions of elevated humidity and temperature. Where aging bloom occurs only sporadically in a few of many batches of green rubber produced for incorporation into green rubber objects, an inability to predict these occurrences of aging bloom can result in significant quantities of such green rubber being wasted or scrapped. Were a reliable means for assuring that zinc stearate aging bloom was suppressed in the making and storing of green rubber and green rubber objects, significant economies could be achieved in reducing defectively manufactured product, excessive recycle of green rubber, and waste associated with the production of unusable green rubber material.

DISCLOSURE OF THE INVENTION

The present invention provides an improvement to the method for making a rubber compound wherein an object is formed from a rubber intermediate having as principal constituents rubber and, optionally fillers, and wherein the formed rubber intermediate includes a zinc containing substance having a form stable to aging bloom and a form subject to aging bloom and a proton donating substance capable of substantially promoting such bloom at a temperature exceeding a predetermined temperature. The improvement comprises the steps of: (a) heating the rubber intermediate and zinc containing substance to a temperature sufficiently elevated and for a sufficient duration to assure conversion of the zinc containing substance substantially completely to the stable form; (b) eliminating the bloom promoting capability of the proton donating substance; and (c) then reducing the temperature of the rubber intermediate to below the predetermined temperature.

In preferred embodiments, the proton donating substance is at least one of water and residual unreacted fatty acid. Where the proton donating substance is water, the predetermined temperature is approximately 68° C. and the water is eliminated by substantial dehydration of the intermediate rubber material during mastication and, where the possibility exists that at least surface portions of the intermediate rubber could exceed the predetermined temperature, by maintaining the intermediate rubber in a low humidity environment, that is less than approximately 50% humidity, during storage.

Where the proton donating substance is residual fatty acid in the masticated intermediate rubber, the predetermined temperature is approximately 50° C. and the fatty acid is eliminated by the introduction of a scavenger for the fatty acid. In preferred embodiments, fatty acids contained in or added to the intermediate rubber compound during mastication react with a zinc containing substance also introduced during preparation of the intermediate rubber to produce the salt of the fatty acid and the zinc containing substance. Typically then, the scavenger is a material readily reactive with the fatty acid to form a reaction product that is non proton donating, and preferably the scavenger is a zinc containing substance, the same substance introduced into the intermediate rubber compound to form a salt with the fatty acid. Preferably, essentially all residual fatty acid in the green rubber compound is consumed or reacted in such a way as to be non-proton donating when preparation of the intermediate rubber compound is complete. Preferably, the zinc substance is zinc oxide, the fatty acid is stearic acid, and the reaction product would be zinc stearate.

Green rubber may be provided with a zinc containing substance, the reaction product of a zinc compound and a fatty acid, the reaction product having a stable form not subject to aging bloom and a form subject to aging bloom by forming and heating the reaction product to a temperature sufficient and for a sufficient duration to convert the reaction product to the stable form and thereafter removing any proton donating substance therefrom. The green or intermediate rubber compound is freed of proton donating substances, substantially, and intermixed with the reaction product after which the intermixture is cooled to below at least 68° C. if storage or handling in a humid environment is desirable or necessary.

The above and other features and advantages of the invention will become more apparent when considered in light of the description of a preferred embodiment of the invention that follows.

BEST EMBODIMENT OF THE INVENTION

In a rubber forming process wherein an intermediate non-vulcanized or so-called green rubber compound is formed, the intermediate compound including additives for assisting subsequent vulcanization processes, and wherein one such additive is a zinc salt of a fatty acid, the salt being susceptible to aging bloom, the present invention provides an improvement to the rubber formulating process to substantially reduce the opportunity for the formation of aging bloom upon the intermediate rubber compound.

Zinc containing compounds are frequently used as vulcanization activators in the making of vulcanized rubber objects. Typically, such vulcanization activators are incorporated into uncured rubber being blended for shaping into an appropriate structure for subsequent vulcanization into the rubber object. The zinc containing compounds functioning as vulcanization activators may be joined by vulcanizing agents and accelerators as well as antioxidants and the like incorporated into uncured rubber together with optionally, fillers to form an intermediate rubber compound suitable for forming structures for subsequent vulcanization to rubber objects. Typically the zinc containing compound is a zinc salt of a fatty acid formed by introducing into the rubber intermediate compound a zinc containing compound and a fatty acid, typically stearic acid. Both natural rubber and synthetic rubbers typically include fatty acids such as stearic acid as a natural by-product of formation and these fatty acids are available for a reaction with any zinc containing compound introduced into the rubber intermediate in addition to any added fatty acids. Depending upon the quantity of both fatty acids introduced into the intermediate rubber compound and those contained inherently within the intermediate rubber compound, and upon the quantity of zinc containing compound introduced into the intermediate rubber compound, either substantially all of the fatty acids will be consumed by reaction with the zinc containing compound to leave an excess of the zinc containing compound, or substantially all of the zinc containing compound will be consumed by reaction with the fatty acids to leave a residual of fatty acid in the intermediate rubber compound.

Typically the zinc compound is zinc oxide (ZnO), and the zinc oxide reacts with fatty acids to produce zinc salts or esters of the fatty acids. Where the fatty acid is a stearic acid, the reaction product is zinc stearate and the term zinc stearate is used herein to denote generally a salt of a fatty acid and a zinc compound reactive with the fatty acid such as zinc oxide.

Zinc stearate has been found to exist in two separate forms termed here, for convenience, Form I and Form II. Form I zinc stearate, when subjected to testing within a differential scanning calorimeter, demonstrates a thermographic peak (representing a melting point) at approximately 127° C. Form I zinc stearate, when subjected to infrared spectra testing has demonstrated an absorption peak at approximately 1530 $cm^{-1}$.

Conversely, zinc stearate Form II when subjected to differential scanning calorimeter testing has demonstrated a therographic peak (representing a melting point) at approximately 117° C. and zinc stearate Form II when subjected to infrared spectra evaluation has demonstrated a double absorption peak at about approximtely 1530 and 1550 $cm^{-1}$.

Both Form I and Form II zinc stearate were subjected to field desorption mass spectroscopy, both demonstrating a molecular weight of approximately 1970. The particular molecular weight would appear to indicate a tetrahedral structure having molecular form $Zn_4OSt_6$. It should be noted, however, that elemental analysis of zinc stearate, both Form I and Form II, seems indicative of a ratio of one zinc for each two stearates.

A green rubber intermediate is formed by the blending of green or unvulcanized rubber, additives, and fillers, if any, in well-known manner often termed mastication, a plurality of mastications often being employed. Where the last mastication of intermediate rubber compound is conducted at an elevated temperature whereby rubber removed from the masticator is possessed of a temperature in excess of the melting temperature of Form II zinc stearate, the Form II zinc stearate blooms on the surface of the intermediate rubber compound. This blooming phenomenon is known as thermal bloom and is relatively easily prevented by assuring that the temperature of rubber exiting the masticator is below the melting point of Form II zinc stearate. For purposes of this specification, bloom shall mean the presence of an elevated concentration of a material such as zinc stearate on the surface of green rubber or green rubber intermediate compared to the average concentration of the particular material within the entirety of the green rubber.

A separate blooming problem, one developing over a more elongated time following completion of mastication of the intermediate rubber compound appears to involve a blooming of Form I zinc stearate. This so-called aging bloom developes more slowly; a period of hours, days or weeks being involved in lieu of the seconds or minutes characterizing the onset of thermal bloom.

It has now been discovered that maintaining zinc stearate substances contained in intermediate rubber compounds in the so-called Form II state substantially facilitates the prevention of aging bloom. Maintaining zinc stearate in the Form II state is accomplished primarily by insuring that Form I zinc stearate formed by the reaction between the zinc containing compound and the fatty acid is converted to Form II zinc stearate and that subsequent reconversion of the Form II zinc stearate to Form I zinc stearate is prevented.

It has been discovered that, in the reaction between a zinc containing compound such as zinc oxide and a fatty acid such as stearic acid, Form I zinc stearate forms first. During mastication a conversion of the zinc oxide and fatty acid to zinc stearate is nearly completed, conversion of the Form I zinc stearate to Form II zinc stearate commences. If allowed to proceed without interruption, substantially all Form I zinc stearate converts to Form II zinc stearate. It is necessary that the reaction between the zinc containing compound and the fatty acid to produce Form I and subsequently Form II zinc stearate occur at a temperature sufficiently elevated to cause the reaction to proceed at an acceptable rate and for the conversion from Form I zinc stearate to Form II zinc stearate, it is necessary that the temperature be at least in excess of the melting temperature of the Form I zinc stearate that is 127° C. For that reason, mastication is typically conducted at a temperature in excess of 127° C.

It has been found that the presence of a proton donating substance, such as water or a residual fatty acid in the intermediate rubber compound after mastication can initiate a reversion of Form II zinc stearate to Form I zinc stearate. Reversion, it has been found, occurs only when the temperature at which the intermediate rubber compound is maintained exceeds a particular temperature associated with a particular proton donating substance. So, for example, reversion occurs in the presence of water only at a temperature in excess of approximately 68° C. Reverion proceeds extremely quickly, particularly in the presence of antacid, and it has been found to be very difficult if not impossible to cool masticated rubber sufficiently rapidly in commercial quantities to avoid reversion. Likewise, zinc stearate undergoes reversion from Form II to Form I in the presence of residual stearic acid only at a temperature exceeding approximately 50° C.

Therefore, in preventing the aging bloom of zinc stearate, it is a necessary condition to satisfactory preparation of intermediate green rubber compounds that the proton donating substance must be stripped of its capability for donating protons prior to cooling to a temperature at which Form II reverts to Form I. Typically stripping the proton donating substance of its donating capability involves tying up the proton donating substance by means of chemical reaction. For storage of the green rubber compound at a temperature below the predetermined temperature at which reconversion from Form II zinc stearate to Form I zinc stearate occurs for a particular proton donating substance present in the green rubber compound is essential.

So, for example, where water is a proton donating substance present in green rubber compound being masticated, the masticating green rubber should be masticated at a temperature sufficient to assure that, upon completion of mastication, all residual water present in the green rubber compound shall have been removed by evaporation and substantially all zinc stearate present in the green rubber being masticated shall have been converted to Form II. Before, and during mastication however, water may be necessary as contributing to the reaction of zinc oxide and fatty acids. After mastication, the green rubber compound should be cooled at least on external surfaces to a temperature below 68° C. before exposing the green rubber compound to conditions of elevated humidity, that is humidity in excess of about 35%. Preferably cooling is accomplished rapidly to avoid problems with thermal bloom.

Alternately, where water is the proton donating substance and is present in relatively small quantities, masticated green rubber compound, if physically feasible, can be cooled very rapidly to a temperature below 68° C. and then maintained at or below 68° C. during subsequent storage and handling. Much preferably, however, substantially all residual water in the green rubber intermediate compound being masticated is removed and the rubber is then relatively rapidly cooled to 68° C. or less and maintained at such a temperature under conditions of relatively low humidity.

Where the proton donating substance is a fatty acid residual to the reaction between a zinc containing compound and a fatty acid, either the fatty acid must be eliminated by chemical reaction or the intermediate rubber compound being masticated must be very rapidly cooled to a temperature below 50° C. following mastication. But where the rubber has an elevated volume to surface ration, such cooling typically is impractical. Elimination of the fatty acid can be accomplished by reaction with any suitable or conventional scavenger such as a chemical base, but more typically is removed by scavenging with the zinc compound being reacted with the fatty acid.

Elimination employing the zinc compound being reacted with the fatty acid comprises simply introducing a significant excess over the stoichiometric quantity of this zinc compound into the green intermediate rubber compound sufficient to assure reaction with all residual fatty acids. As rubber, natural or synthetic, typically contains fatty acids in excess of those which may be added to intermediate green rubber compound for purposes of producing the zinc salt of the fatty acid, a significant excess of the zinc containing compound may be required to assure the elimination of all fatty acids within the intermediate green rubber compound. Typically zinc oxide is much preferred.

While rapidly lowering the temperature of masticated green rubber intermediate compound containing residual fatty acids to a temperature below 50° C. may under conditions of a very low volume to surface ratio in the green rubber suffice to prevent aging bloom, the aging bloom phenomenon in uncured rubber containing residual fatty acids proceeds quite rapidly as a result of the fatty acid being an excellent catalyst for reconversion of zinc stearate from Form II to Form I. Preferably, intermediate green rubber compound contains substanitally no residual fatty acids following mastication and is relatively rapidly reduced to a temperature not exceeding 50° C. and is maintained at that temperature in an environment relatively free from humidity.

EXAMPLE 1

A mixture of three parts zinc oxide and three parts by weight stearic acid was combined with 100 parts FM366 rubber (cis polyisoprene) or synthetic natural rubber commercially available, at 50° C. and placed into differential scanning calorimeter capsules. After five (5) minutes at 50° C., one capsule was subjected to analysis producing a thermogram which indicated by a single melting point peak at 51° C. that no reaction between the zinc oxide and the stearic acid had occurred. A second capsule was heated for five minutes at 177° C. and subjected to analysis yielding a thermogram which indicated that a small amount of zinc stearate Form I had been formed as indicated by the melting point peak at 127° C. but that most of the zinc oxide and stearic acid remained unreacted as indicated by a large thermogram peak at 51° C. A third capsule was heated at 177° C. for 20 minutes and a subsequent thermogram indicated that virtually all stearic acid had reacted as indicated by virtually no melting peak at 51° C. and a substantial melting peak at 127° C. A small melting peak at 117° C. was observed indicative of some conversion of Form I zinc stearate to Form II zinc stearate. A fourth capsule was heated at 177° C. for twenty five minutes; virtually all stearic acid had by then reacted as indicated by the absence of a thermographic melting peak at 51° C. and a presence of a substantial thermographic peak at 127° C. Continued converstion of Form I zinc stearate to Form II zinc stearate was indicated by the observation of a significantly enlarged melting peak at 117° C. A fifth capsule was heated at 177° C. for 30 minutes. Thermographic analysis of this fifth capsule indicated no melting peak at 51° C. and a relatively small melting peak at 127° C. but a substantial melting peak at 117° C. A sixth capsule was heated at 177° C. for approximately 33 minutes and then was subjected to thermographic analysis. An absence of melting peaks at 51° C. and at 127° C. together with a substantial melting peak at 117° C. indicated that reaction of stearic acid and zinc oxide had proceeded essentially completely to Form II zinc stearate.

From the foregoing, it would appear that (a) a reaction between zinc oxide and stearic acid forms a Form I zinc stearate directly; (b) after substantially all stearic acid is consumed in the reaction with zinc oxide, zinc stearate Form I converts to zinc stearate Form II.

EXAMPLE 2

Commercially available zinc stearate, available as Fisher Scientific No. Z-65, was subjected in infrared analysis and demonstrated an absorption peak at 1530 cm$^{-1}$. The Form I zinc stearate obtained from Fisher Scientific was placed in a vacuum oven at 145° C.; some water was sprinkled on the surface of the zinc stearate. A beaker of water was placed in the oven to insure elevated humidity conditions. After three hours the beaker of water was removed, water existing on the walls of the oven was wiped off, and a vacuum was applied at 145° C. After one hour of vacuum, the oven was deactivated and cooled to 25° C. under vacuum over a period of approximately 3 hours. The resulting product was subjected to infrared analysis and demonstrated a dual absorption peak at 1530 and 1550 cm$^{-1}$. Heating of Form I in the absence of water, or cooling of Form II from elevated temperature in the presence of water yielded primarily Form I.

EXAMPLE 3

Form I zinc stearate, 3 parts by weight, as obtained from Fisher Scientific were milled into each of two batches of uncured polyisoprene, saturated with water and two batches of uncured polyisoprene, having substantially no included water at 40° C. Form II, 3 parts by weight, zinc stearate as made according to Example 2 were milled into each of two batches of wet polyisoprene and two batches of dry polyisoprene having substantially no included water at 40° C. 0.3 parts of stearic acid was milled into one of each of the two wet batches for each form of zinc stearate and one of each of the two dry batches for each form of zinc stearate. All eight batches were placed in a high humidity oven for sixteen hours at 50° C. Dry polyisoprene was milled at 140° C. for ten minutes before be used to assure dryness; polyisoprene was saturated with water by being immersed in distilled water for at least 72 hours at room temperature prior to use. All four polyisoprene batches containing Form I zinc stearate exhibited bloom. Some Form I zinc stearate bloom on some samples was more noticeable than bloom on others, however, and bloom for purposes of comparison was evaluated by comparing the infrared absorption characteristics of the surface layer of a polyisoprene sample with an infrared absorption analysis of rubber obtained from the inside of the polyisoprene sample. With Form I zinc stearate, wet rubber having acid present showed a multiple of 22 between the infrared analysis of surface polyisoprene and interior polyisoprene. Dry polyisoprene having Form I zinc stearate therein and residual acid demonstrated about a 7 fold differential between the infrared absorption of surface polyisoprene and polyisoprene interior to the sample. Wet rubber having no acid, but including Form I zinc stearate demonstrated a 6 ½ fold differential between the infrared analysis of the surface polyisoprene and the interior polyisoprene. Dry polyisoprene having Form I zinc stearate therein but no acid showed the least bloom; a differential of five characterizing the surface polyisoprene from the batch interior polyisoprene.

Of the polyisoprene samples prepared employing Form II zinc stearate, the only samples that demonstrated bloom were those including acid. The sample of wet polyisoprene including Form II zinc stearate and stearic acid demonstrated bloom approximately equivalent to the corresponding Form I sample. The dry polyisoprene including Form II zinc stearate and stearic acid demonstrated bloom approximating the bloom demonstrated by the equivalent Form I zinc stearate batch. The wet and dry polyisoprene samples, including Form II zinc stearate but without acid did not demonstrate significant bloom.

EXAMPLE 4

The non-blooming Form II zinc stearate samples of Example 3 (wet and dry polyisoprene having no residual acid) were then maintained at 69° C. for sixteen hours whereupon bloom developed approximately equaling the bloom demonstrated by polyisoprene samples containing Form I zinc stearate but no acid in Example 3.

EXAMPLE 5

Polyisoprene saturated with water in accordance with Example 3 and including Form I zinc stearate and 0.3 parts stearic acid demonstrated modest aging bloom at ambient laboratory temperatures in 50% humidity after 16 hours. Infrared spectra of polyisoprene taken from the surface of this sample indicated a zinc stearate concentration roughly 7½ times the concentration present in internal portions of the sample.

EXAMPLE 6

Portions of the solid zinc stearate Form II of Example 2 as a powder were blended with water for 24 hours at room temperature, and for one hour each at 46° C., 55° C., 65° C., and 80° C. No visable change in the infrared pattern was detected for the room temperature and 46° temperature sampled. A very small change in the IR pattern was detected at 55° C. At 65° C. a minor change in the thermograph melting point became apparent with the melting point increasing to approximately 122°–123° C. At 80° C. a drastic change was observed in the thermographic melting points with the melting point being 126° C.

EXAMPLE 7

Three batches each containing 1 mm ZnO and 2 mm Octadecanoic acid were mixed in a morter. To one of the batches one drop of 25% aqueous ammonia was added and to another of the batches one drop of water was added. After heating for five minutes at 154° C., the sample having neither ammonia or water added demonstrated no thermographic melting point peak at 127° C., the sample having water added demonstrated a minor thermographic melting point at 127° C. and the sample having aqueous ammonia added thereto demonstrated a substantial thermographic melting point peak at 127° C. It was concluded that water enhances the reaction between zinc oxide and octadecanoic acid but that aqueous ammonia substantially enhances the reaction between zinc oxide and octadecanoic acid. It is believed that the ammonia may also function as a scavenger for residual fatty acid.

To suppress zinc stearate aging bloom in the practice of making rubber then, it is important during the preparation of a green intermediate rubber compound that is to include zinc stearate, that any final mastication of the intermediate rubber compound be conducted in such a manner that substantially all residual fatty acid be eliminated prior to any handling or storage of the green rubber compound following final mastication. For storage and handling, the green rubber should be cooled to and maintained below about 50° C.

Where water is present in the green intermediate rubber compound, substantially all the water should be removed during final mastication to avoid Form II to Form I reversion. For subsequent handling and storage the temperature following mastication should be maintained at least below about 68° C., and where both water and residual fatty acid are present, at least below about 50° C. following mastication. Where water and fatty acid are removed from the green intermediate rubber compound handling and storage should be under conditions whereby at least exterior portions of the green intermediate rubber compound do not exceed 68° C. where the ambient humidity may exceed about 50% and preferably 35%, and should such a temperature be exceeded then the green rubber should be stored under conditions wherein the humidity is maintained at below at least about 50%.

Where it is desired to remove the bloom promoting capabilities of any residual fatty acid contained within a green intermediate rubber compound, the inclusion of an alkline material such as an alkali or alkaline metal hydroxide or carbonate, ammonia, and an amine may find utility. These so-called scavengers may perform a dual function; for example, the inclusion of diphenylamine included in green intermediate rubber compounds being formed can function both as a scavenger and as an antioxidant.

While a preferred embodiment of the invention has been shown and described in detail, it should be apparent that various modifications and alterations can be made thereto without departing from the scope of the claims that follow.

We claim:

1. In a method for making a rubber compound wherein a rubber intermediate is formed having as principal constituents rubber, and optionally fillers, and wherein the formed intermediate includes a zinc containing substance convertible from a form not subject to bloom upon aging to a form subject to aging bloom and at least one proton donating substance capable of substantially promoting conversion from one form to the other at a temperature exceeding a predetermined temperature, the improvement comprising the steps of: (a) heating the intermediate during formation to a temperature sufficient and for a sufficient duration to convert substantially all the zinc substance to the form not subject to aging bloom; (b) eliminating the bloom promoting capability of proton donating substance; and (c) then reducing the temperature of the intermediate to below the predetermined temperature.

2. The method of claim 1, the proton donating substance being water, the predetermined temperature being about 68° C., the water being eliminated by dehydration prior to cooling, and the intermediate being maintained in a low humidity environment at least while surface portions of the intermediate exceed the predetermined temperature.

3. The method of claim 1, the proton donating substance being a fatty acid, the predetermined temperature being about 50° C., the fatty acid being eliminated by the introduction of a scavenger for the fatty acid.

4. The method of claim 3, the scavenger being a zinc compound readily reactive with the fatty acid to form a reaction product useful in further processing of the intermediate rubber.

5. The method of claim 3 the intermediate being maintained in a low humidity environment at least while the surface portions of the intermediate remain in excess of about 68° C.

6. A method for introducing a reaction product of zinc and a fatty acid, having a stable form not subject to aging bloom and an unstable form subject to aging bloom, into a green rubber compound comprising the steps of: (a) forming the reaction product; (b) heating the reaction product to a temperature sufficient and for a sufficient duration to convert the reaction product to the stable form and thereafter removing any proton donating substances therefrom; (c) substantially freeing the green rubber compound of proton donating substances; and (d) intermixing the reaction product and the green rubber compound.

7. The method of claim 6 including the steps of cooling the intermixture to at least below 68° C. for storage in moist environments.

8. The method of claim 4 the intermediate being maintained in a low humidity environment at least while the surface portions of the intermediate remain in excess of about 68° C.

* * * * *